US010604294B1

(12) United States Patent  
Valenti, Jr. et al.

(10) Patent No.: US 10,604,294 B1  
(45) Date of Patent: Mar. 31, 2020

(54) LABEL WITH REMOVABLE SECTION

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 80 days.

(21) Appl. No.: 15/785,995

(22) Filed: Oct. 17, 2017

Related U.S. Application Data

(63) Continuation-in-part of application No. 15/293,397, filed on Oct. 14, 2016, now Pat. No. 10,198,971.

(60) Provisional application No. 62/242,584, filed on Oct. 16, 2015.

(51) Int. Cl.

| | | |
|---|---|---|
| *G09F 3/00* | (2006.01) | |
| *B65C 9/18* | (2006.01) | |
| *B65C 1/02* | (2006.01) | |
| *B32B 7/06* | (2019.01) | |
| *G09F 3/02* | (2006.01) | |
| *G09F 3/10* | (2006.01) | |

(52) U.S. Cl.
CPC .............. *B65C 9/1869* (2013.01); *B32B 7/06* (2013.01); *B65C 1/021* (2013.01); *G09F 3/0289* (2013.01); *G09F 3/10* (2013.01); *G09F 2003/0247* (2013.01); *G09F 2003/0272* (2013.01)

(58) Field of Classification Search
CPC ................................................ G09F 2003/0269
USPC .......................................................... 428/43
See application file for complete search history.

(56) References Cited

U.S. PATENT DOCUMENTS 5,761,982 A  *  6/1998  Abt .......................... B26D 7/20  
83/861

* cited by examiner

*Primary Examiner* — Brent T O'Hern  
(74) *Attorney, Agent, or Firm* — Ice Miller LLP

(57) ABSTRACT

A multi-layer label and methods for assembling a multi-layer label. A carrier material with a first label and a second label removably adhered thereto is provided. The first label and second label are dispensed from the carrier, joined together, and applied to a surface, whereby after application the underside of the first label is in contact with the surface and the undersurface of the second label is in contact with the top side of the first label.

7 Claims, 8 Drawing Sheets

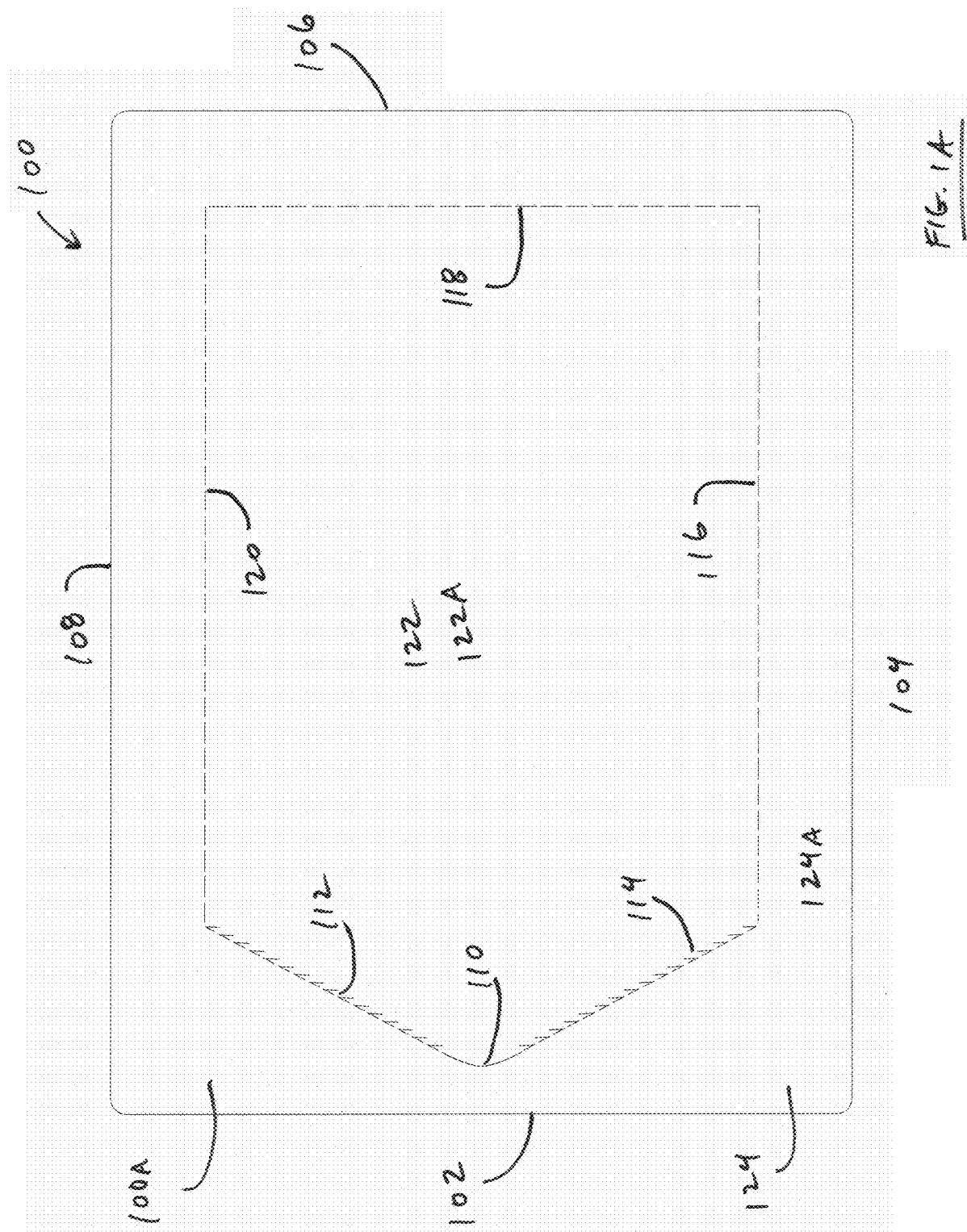

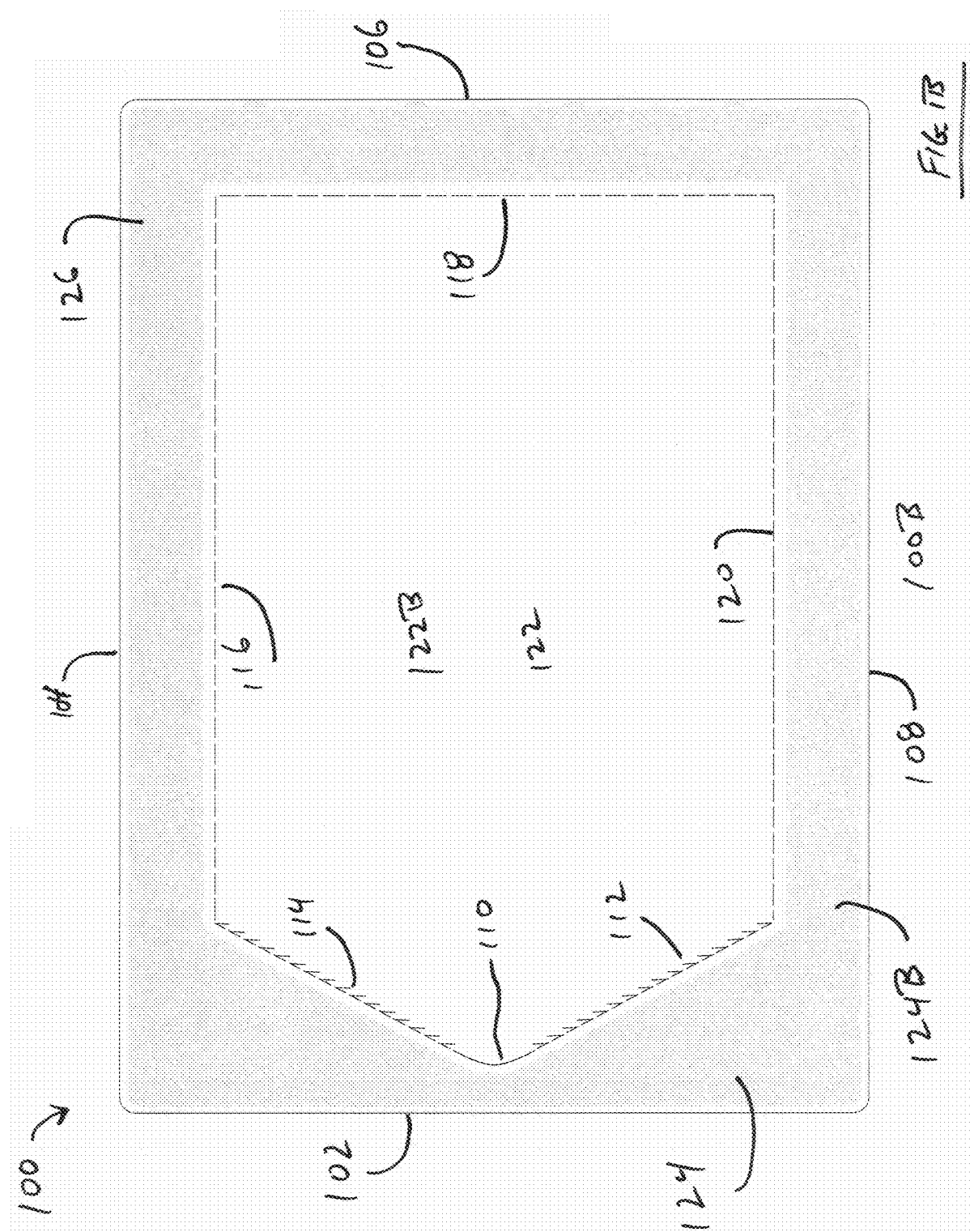

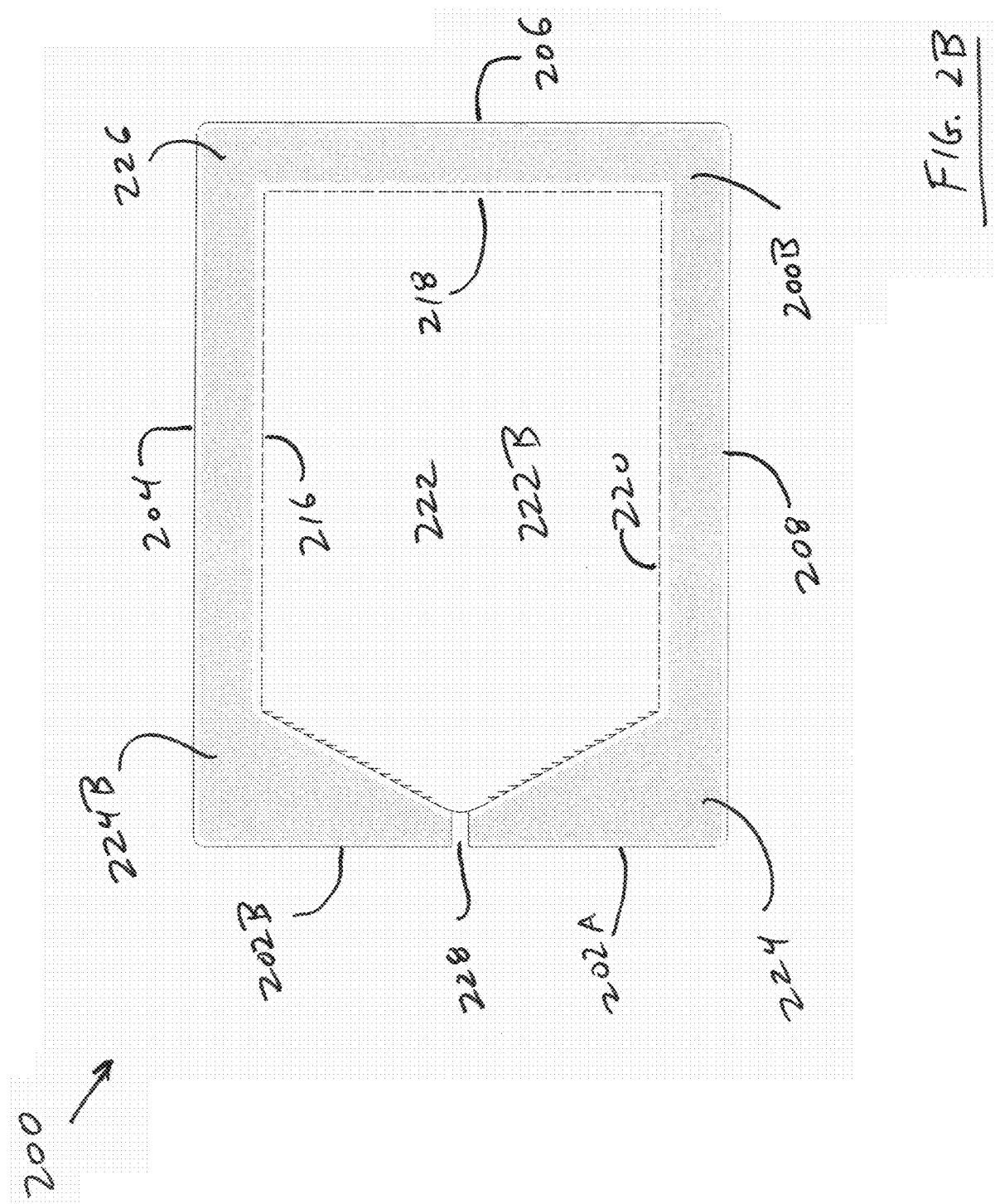

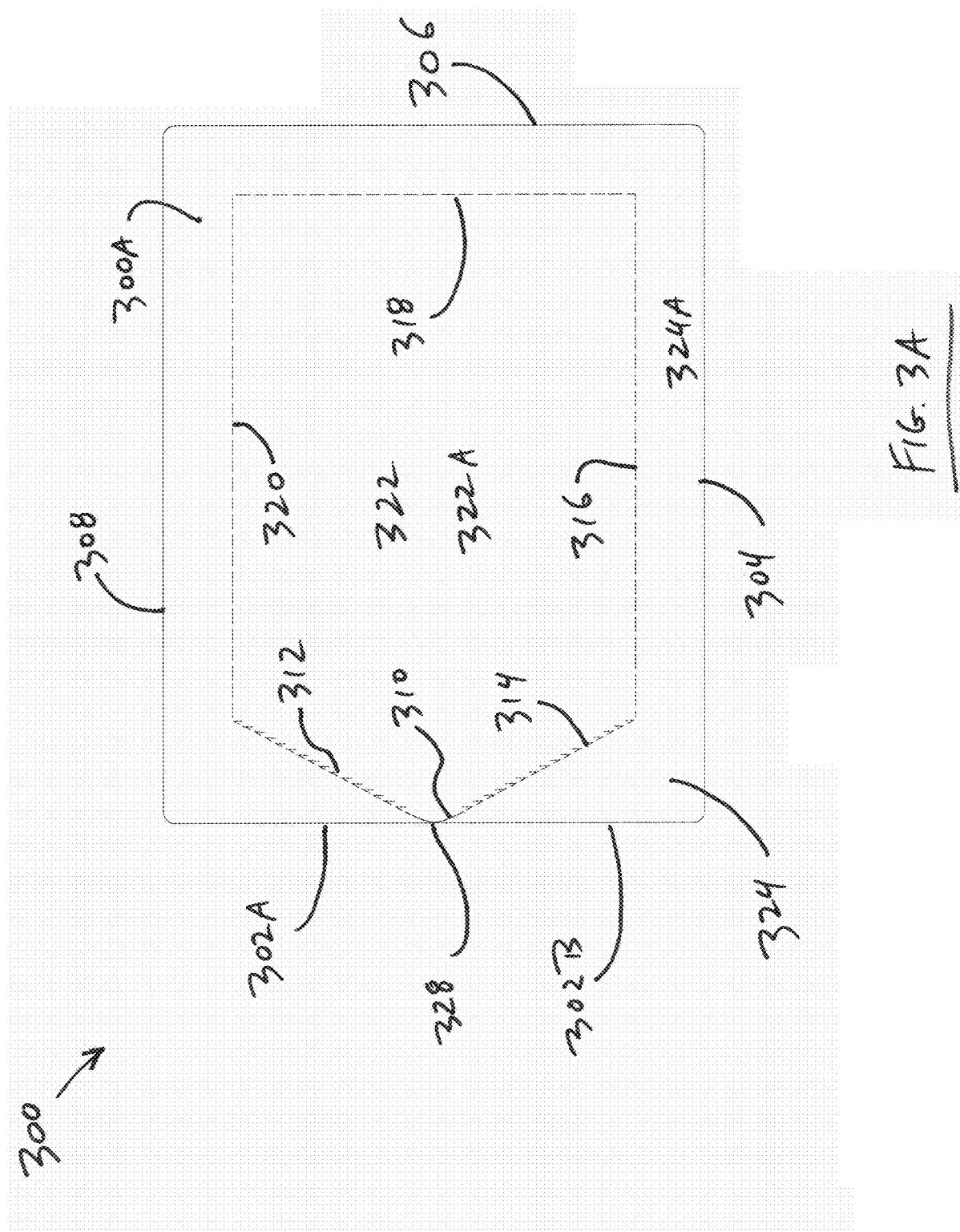

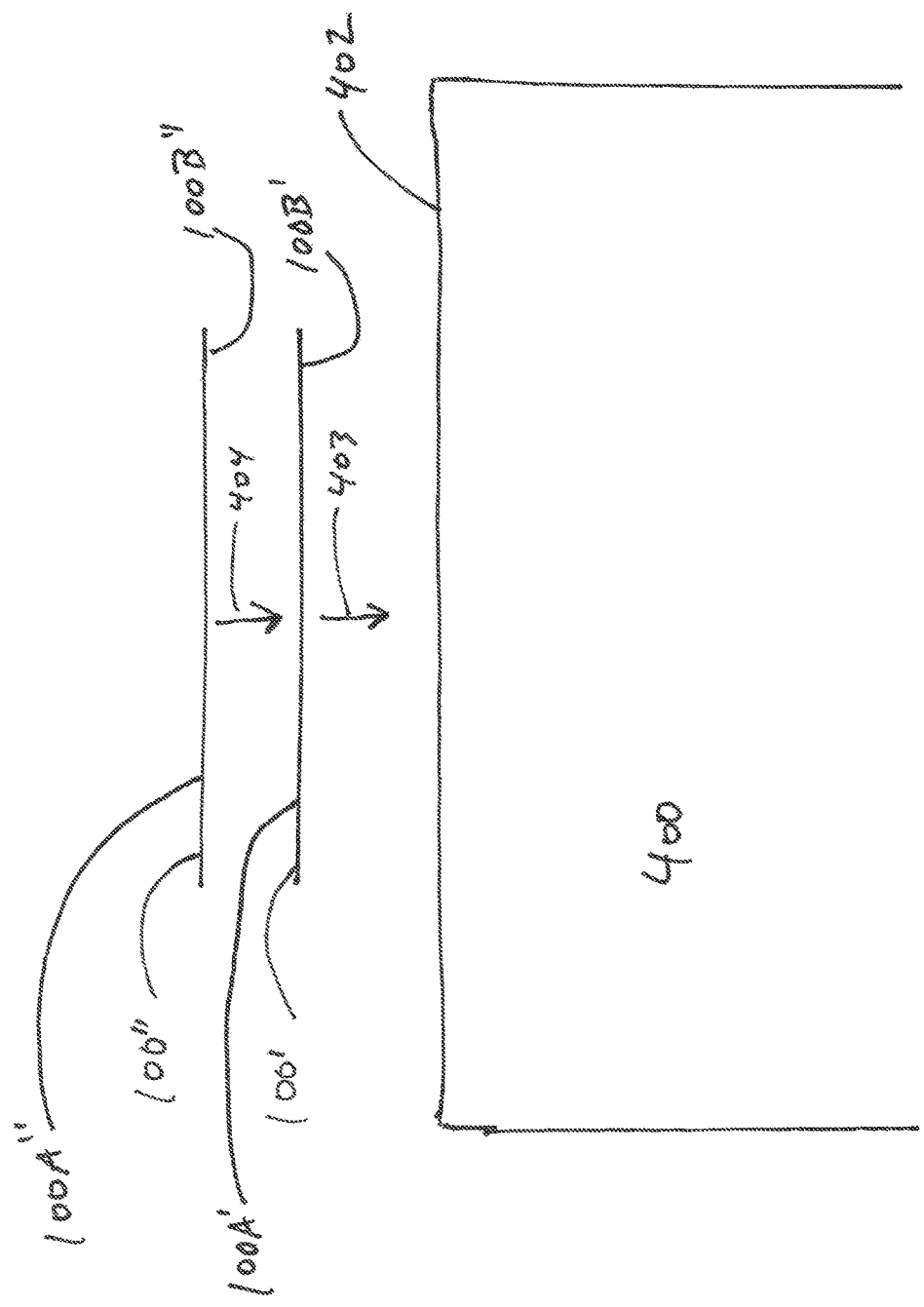

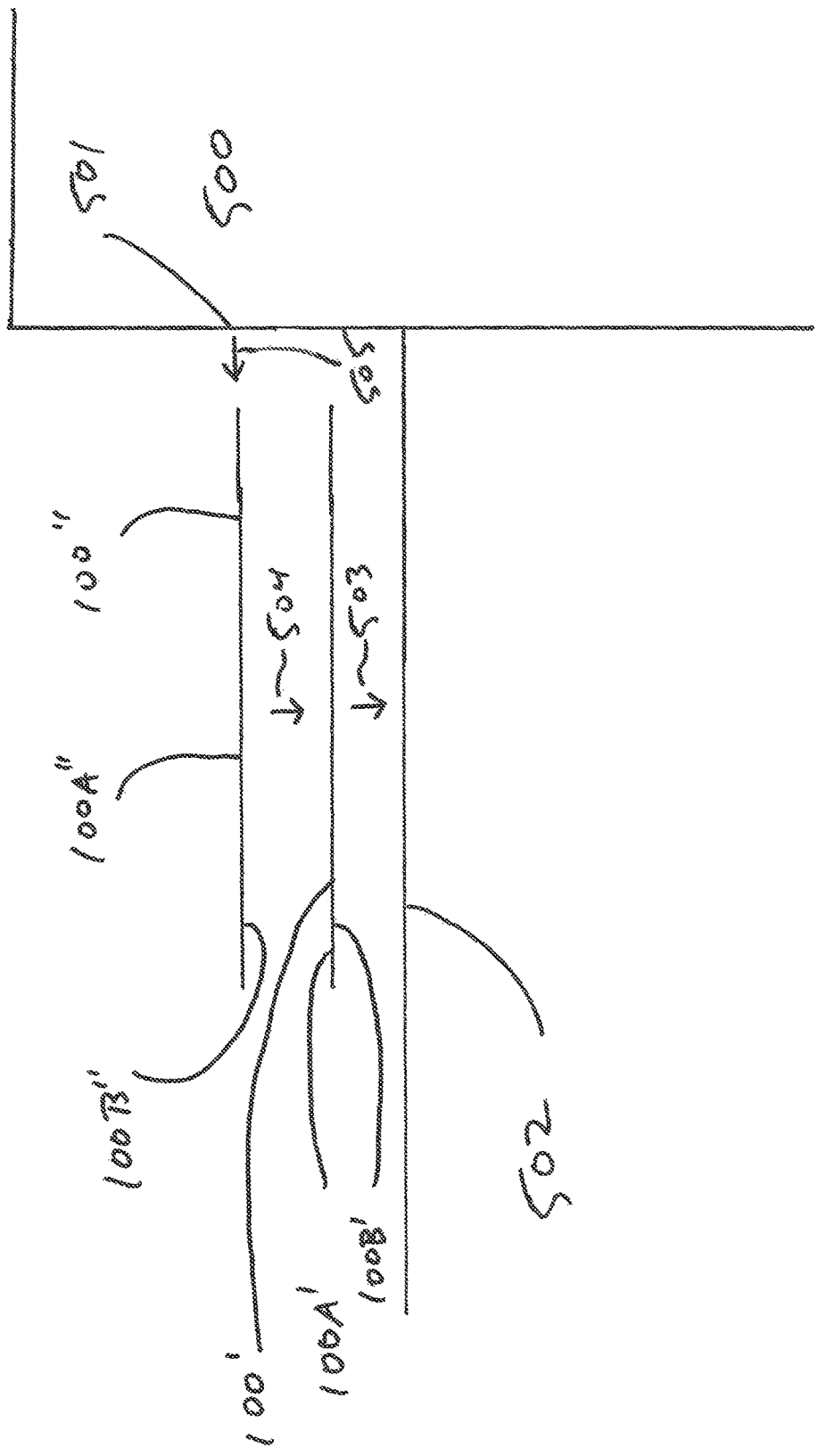

LABEL WITH REMOVABLE SECTION

CROSS-REFERENCE TO RELATED APPLICATIONS

The present application is a continuation in part of U.S. application Ser. No. 15/293,397, filed Oct. 14, 2016; which is a non-provisional of, and claims priority to U.S. Provisional Patent Application No. 62/242,584, filed Oct. 16, 2015. The disclosure of each of the foregoing applications is incorporated by reference in its entirety.

BACKGROUND

Labels are commonly used to secure printed indicia to packages to indicate shipping or other information. In the instance of a shipping use, a separate packing list may be enclosed within a package shipped to the customer containing a purchased item.

There is significant demand for a labeling method that allows printing and application of a lower label and an upper label to a surface. For example, there is significant demand for a labeling method that allows printing and application of a packing list and shipping label to the surface of a sealed carton. Because the carton is sealed prior to packing list generation, it is not efficient to open it to insert a packing list. High volume shipping of such packages requires rapid attachment of a packing list and a shipping label to the package. It is preferred to conceal the information of the packing list until the final recipient receives the shipped package.

For the foregoing reasons, it is desired to provide labeling forms and methods that allows printing and application of a packing list label and shipping label to the surface of a sealed carton while avoiding the many shortcomings of existing labeling forms and methods.

SUMMARY

The present disclosure includes disclosure of at least one system of labels for application to a surface. In at least one embodiment, a label system according to the present disclosure comprises a carrier material, an upper label, and a lower label. An upper label of at least one such embodiment comprises a top surface and an opposing undersurface, the top surface and the undersurface having a leading edge and a trailing edge, and the undersurface in contact with the carrier material. A lower label of at least one such embodiment comprises a top side and an opposing underside, the top side and the underside having a leading margin and a trailing margin, and the underside being in contact with the carrier material. According to at least one such embodiment of the present disclosure, the upper label and the lower label are in contact with the carrier material in adjacent positions with the trailing edge adjacent to the leading margin, and the upper label and the lower label are configured for dispensing sequentially from the carrier material onto a label applicator apparatus such that when the upper label and the lower label are dispensed onto the label applicator apparatus the lower label is positioned against the undersurface of the upper label prior to attachment of the upper label and the lower label to an article.

In an aspect of at least one embodiment of the present disclosure, an upper label comprises a removable segment and a lower label comprises a removable region, and when the upper label and the lower label are dispensed onto a label applicator apparatus, the removable segment and the removable region are in registration.

In an aspect of at least one embodiment of the present disclosure, an undersurface comprises a zone with reduced adhesive properties and an underside comprises an area with reduced adhesive properties, and when an upper label and a lower label are dispensed onto a label applicator apparatus the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and when the upper label and a lower label are dispensed onto a label applicator apparatus, the lower label is held in position against the undersurface of the upper label by a vacuum force generated by the label applicator apparatus, the vacuum force acting through the one or more holes.

In an aspect of at least one embodiment of the present disclosure, all of the underside comprises reduced adhesive properties.

In an aspect of at least one embodiment of the present disclosure, all of the underside comprises an adhesive layer covered with an adhesive deadening agent.

In an aspect of at least one embodiment of the present disclosure, the undersurface comprises pressure sensitive adhesive that removably adheres the undersurface to the carrier material.

In at least one embodiment, a label system according to the present disclosure comprises a carrier material, an upper label, and a lower label. An upper label of at least one such embodiment is removably adhered to the carrier material, and comprises a top surface, an undersurface, and a removable segment. An upper label of at least one such embodiment is bounded by a leading edge, a trailing edge, and first and second side edges. The undersurface of an upper label of at least one such embodiment comprises adhesive on at least a portion thereof and such an upper label is removably adhered to the carrier material by the adhesive. A lower label of at least one such embodiment is removably adhered to the carrier material in a position on the carrier material adjacent to the upper label and comprises a top side and an opposing underside. A lower label of at least one such embodiment is bounded by a leading margin, a trailing margin, and a first and second side margins. According to at least one such embodiment of the present disclosure, the upper label and the lower label are configured for dispensing sequentially from the carrier material onto a label applicator apparatus, such that when the upper label and the lower label are dispensed onto the label applicator apparatus the top surface is positioned against the label applicator apparatus, the top side of lower label is positioned against the undersurface of the upper label, and the underside is exposed.

In an aspect of at least one embodiment of the present disclosure, the top side of an upper label comprises a first surface area circumscribed by the leading margin, the trailing margin, and the first and second side margins, and the top surface of a lower label comprises a second surface area circumscribed by the leading edge, the trailing edge, and the first and second side edges, and the second surface area is not larger than the first surface area.

In at least one embodiment, a label system according to the present disclosure comprises a carrier material, a removable upper label on the carrier material, and a removable lower sheet on the carrier material in a position on the carrier material adjacent to the upper label. An upper label of at least one such embodiment comprises a top surface and an opposing undersurface, the undersurface facing the carrier material. A lower sheet of at least one such embodiment comprises a top side and an opposing underside, the underside facing the carrier material. According to at least one such embodiment of the present disclosure, wherein the upper label and the lower sheet are configured for dispensing sequentially from the carrier material onto a label applicator apparatus such that the top side of the lower sheet is positioned against the undersurface when the upper label and the lower sheet are dispensed onto the label applicator apparatus.

In an aspect of at least one embodiment of the present disclosure, an upper label comprises a removable segment, and a lower sheet comprises a removable region, and when the lower sheet is dispensed onto the label applicator apparatus, the removable segment and the removable region are in registration.

In an aspect of at least one embodiment of the present disclosure, the undersurface of an upper label comprises a zone with reduced adhesive properties, and the underside of a lower sheet comprises an area with reduced adhesive properties, and when the lower sheet is dispensed onto the label applicator apparatus, the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and a lower sheet is held in position against the undersurface of the upper label by the vacuum force generated by a label applicator apparatus, the vacuum force acting through the one or more holes.

In an aspect of at least one embodiment of the present disclosure, a lower sheet is held in position against the undersurface of the upper label by a vacuum force generated by a label applicator apparatus.

In an aspect of at least one embodiment of the present disclosure, all of the underside of a lower sheet comprises reduced adhesive properties.

In an aspect of at least one embodiment of the present disclosure, all of the underside of a lower sheet comprises an adhesive layer covered with an adhesive deadening agent.

In an aspect of at least one embodiment of the present disclosure, the undersurface of an upper label comprises adhesive, and when a lower sheet is dispensed onto the label applicator apparatus the adhesive on the undersurface adhesively interacts with the top side of the lower sheet.

In at least one embodiment, a label system according to the present disclosure comprises a first label, the first label comprising a sheet material having an upper side and an opposing lower side, the upper side and the lower side bounded by a leading edge, a trailing edge, and first and second side edges connecting the leading edge and the trailing edge, at least one line of weakness in the sheet material, the at least one line of weakness not intersecting with any of the leading edge, the trailing edge, or the first or second side edges, the at least one line of weakness comprising at least one non-linear segment having an apex oriented toward the leading edge, wherein the at least one line of weakness defines a removable region within the at least one line of weakness, and a frame region outside of the at least one line of weakness, and adhesive on at least a portion of the frame region of the lower side; and a second label identical to the first label, the second label layered over and adhered to the first label with the removable regions of the first label and the second label in registration.

In at least one embodiment, a label system according to the present disclosure comprises a first label, the first label comprising a sheet material having an upper side and an opposing lower side, the upper side and the lower side bounded by a leading edge, a trailing edge, and first and second side edges connecting the leading edge and the trailing edge, at least one line of weakness in the sheet material, the at least one line of weakness not intersecting with any of the leading edge, the trailing edge, or the first or second side edges, the at least one line of weakness comprising at least one non-linear segment having an apex oriented toward the leading edge, wherein the at least one line of weakness defines a removable region within the at least one line of weakness, and a frame region outside of the at least one line of weakness, a void in the sheet material located between the non-linear segment and the leading edge, and adhesive on at least a portion of the frame region of the lower side; and a second label identical to the first label, the second label layered over and adhered to the first label with the removable regions of the first label and the second label in registration.

In at least one embodiment, a label system according to the present disclosure comprises a first label, the first label comprising a sheet material having an upper side and an opposing lower side, the upper side and the lower side bounded by a leading edge, a trailing edge, and first and second side edges connecting the leading edge and the trailing edge, at least one line of weakness in the sheet material, the at least one line of weakness comprising at least one non-linear segment having an apex oriented toward and intersecting with the leading edge, the at least one line of weakness not otherwise intersecting with any of the leading edge, the trailing edge, or the first or second side edges, wherein the at least one line of weakness defines a removable region within the at least one line of weakness, and a frame region outside of the at least one line of weakness, and adhesive on at least a portion of the frame region of the lower side; and a second label identical to the first label, the second label layered over and adhered to the first label with the removable regions of the first label and the second label in registration.

The present disclosure includes disclosure of methods for assembling a multi-layer label. In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet material, said at least one line of weakness not intersecting with any of said leading edge, said trailing edge, or said first or second side edges, said at least one line of weakness comprising at least one non-linear segment having an apex oriented toward said leading edge, wherein said at least one line of weakness defines a removable region within said at least one line of weakness, and a frame region outside of said at least one line of weakness, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably adhered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet material, said at least one line of weakness not intersecting with any of said leading edge, said trailing edge, or said first or second side edges, said at least one line of weakness comprising at least one non-linear segment having an apex oriented toward said leading edge, wherein said at least one line of weakness defines a removable region within said at least one line of weakness, and a frame region outside of said at least one line of weakness, a void in said sheet material located between said non-linear segment and said leading edge, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably adhered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

In at least one embodiment, a method for assembling a multi-layer label according to the present disclosure comprises the steps of providing a label printing apparatus, said label printing apparatus comprising a printing mechanism, a dispensing mechanism, and a receptacle; providing a carrier material to said label printing apparatus, said carrier material comprising a first label removably adhered to said carrier material, said first label comprising a sheet material having an upper side and an opposing lower side, said upper side and said lower side bounded by a leading edge, a trailing edge, and first and second side edges connecting said leading edge and said trailing edge, at least one line of weakness in said sheet material, said at least one line of weakness comprising at least one non-linear segment having an apex oriented toward and intersecting with said leading edge, said at least one line of weakness not otherwise intersecting with any of said leading edge, said trailing edge, or said first or second side edges, wherein said at least one line of weakness defines a removable region within said at least one line of weakness, and a frame region outside of said at least one line of weakness, and adhesive on at least a portion of said frame region of said lower side; separating said first label from said carrier material with said label printing apparatus; dispensing said first label from said label printing apparatus onto said receptacle; advancing said carrier material to provide a second label adjacent to said first label and removably adhered to said carrier material, said second label identical in structure to said first label; separating said second label from said carrier material with said label printing apparatus; and dispensing said second label from said carrier material, wherein said second label alights on said first label such that said second label is layered over and adhered to said first label with said removable regions of said first label and said second label in registration.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein:

FIG. 1A shows the upper side of a label according to at least one embodiment of the present disclosure;

FIG. 1B shows the lower side of a label according to at least one embodiment of the present disclosure;

FIG. 2B shows the lower side of a label according to at least one embodiment of the present disclosure;

FIG. 3A shows the upper side of a label according to at least one embodiment of the present disclosure;

FIG. 4 shows two labels applied to a carton, according to at least one embodiment of the present disclosure.

FIG. 5 shows two labels dispensed from a label printer onto a tray for future application to a surface, according to at least one embodiment of the present disclosure.

DESCRIPTION

Figure 2A:
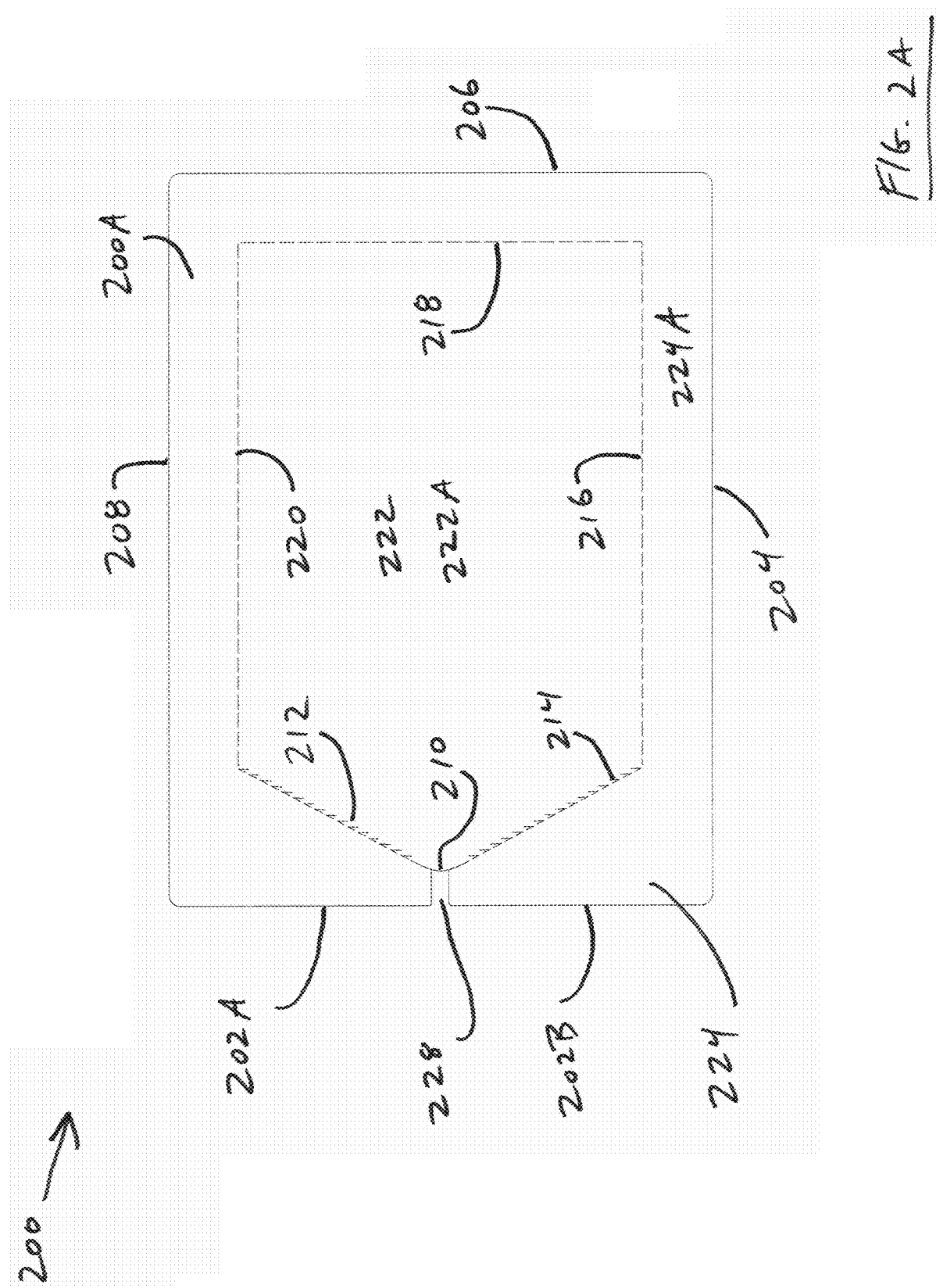
FIG. 2A shows the upper side of a label according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1A shows upper side 100A of label 100 according to at least one embodiment of the present disclosure. In at least one embodiment of the present disclosure, label 100 comprises a label stock material such as, for example, paper, polyester, or another polymer material. In at least one embodiment of the present disclosure, label 100 comprises a label stock material receptive to the printing of indicia thereon. For example, label 100 may be exposed to an ink jet printer, a laser printer, a thermal transfer printer, a direct thermal printer, or another type of printing device capable of applying indicia to label 100. The inks, toners, and/or other printing materials used in the application of indicia to label 100 are selected to be compatible with the printing device used to apply such indicia, the material used for label 100, and the intended use of label 100.

As shown in FIG. 1A, label 100 is bounded by leading edge 102, trailing edge 106, and side edges 104, 108. Label 100 also comprises removable region 122 and frame region 124. Removable region 122 comprises removable region upper surface 122A, and is bounded by lines of weakness 110, 112, 114, 116, 118, 120. Frame region 124 comprises the portion of label 100 outside of lines of weakness 110, 112, 114, 116, 118, 120, but within leading edge 102, trailing edge 106, and side edges 104, 108. As shown in FIG. 1A, frame region 124 comprises frame region upper surface 124A. In at least one embodiment of the present disclosure, indicia is added to upper side 100A of label 100. For example, indicia may be added to removable region upper surface 122A of label 100, or to frame region upper surface 124A of label 100, or to both removable region upper surface 122A and frame region upper surface 124A of label 100.

Lines of weakness 110, 112, 114, 116, 118, 120 serve to weaken the boundary between removable region 122 and frame region 124, facilitating the removal of removable region 122 from frame region 124 as discussed hereinafter. Lines of weakness 110, 112, 114, 116, 118, 120 may comprise cuts or perforations that extend partially or completely through label 100.

In at least one embodiment of label 100, line of weakness 110 comprises a curvilinear cut that completely severs removable region 122 from frame region 124. In at least one embodiment of label 100, line of weakness 110 comprises a curvilinear cut that is the connecting an end of line of weakness 112 to an end of line of weakness 114.

In at least one embodiment of label 100, lines of weakness 112, 114 each comprises a series of angular perforations generally having a V-shape or a Y-shape. The vertex of each angular perforation of line of weakness 112 is oriented in the direction of line of weakness 120, as shown in FIG. 1A. The series of angular perforations comprising line of weakness 112 is arranged so that one side of each angular perforation is substantially coincident with a line extending between an end of line of weakness 110 and an end of line of weakness 120, and the other side of each angular perforation is oriented toward removable region 122 rather than toward frame region 124. The vertex of each angular perforation of line of weakness 114 is oriented in the direction of line of weakness 116, as shown in FIG. 1A. The series of angular perforations comprising line of weakness 114 is arranged so that one side of each angular perforation is substantially coincident with a line extending between an end of line of weakness 110 and an end of line of weakness 116, and the other side of each angular perforation is oriented toward removable region 122 rather than toward frame region 124.

In at least one embodiment of label 100, the angle between line of weakness 112 and lines of weakness 120 is greater than 90°. In at least one embodiment of label 100, the angle between line of weakness 114 and lines of weakness 116 is greater than 90°. In at least one embodiment of label 100, the angle between line of weakness 118 and line of weakness 120 is about 90°. In at least one embodiment of label 100, the angle between line of weakness 118 and line of weakness 116 is about 90°. The use of angular perforations in lines of weakness 112, 114, and the obtuse angles between line of weakness 112 and lines of weakness 120 and between line of weakness 114 and lines of weakness 116, facilitates removal of removable region 122 from frame 124 in one motion without tearing the material of removable region 122.

FIG. 1B shows lower side 100B of label 100 according to at least one embodiment of the present disclosure. Shown in FIG. 1B are label 100 bounded by leading edge 102, trailing edge 106, and side edges 104, 108. Removable region 122 also is shown in FIG. 1B, bounded by lines of weakness 110, 112, 114, 116, 118, 120. Frame region 124 also is shown in FIG. 1B, comprising the area of label 100 outside of lines of weakness 110, 112, 114, 116, 118, 120, but within leading edge 102, trailing edge 106, and side edges 104, 108. As shown in FIG. 1B, removable region 122 comprises removable region lower surface 122B. As shown in FIG. 1B, frame region 124 comprises frame region lower surface 124B. As shown in FIG. 1B, frame region lower surface 124B is at least partially covered with adhesive 126, while removable region lower surface 122B has reduced adhesive properties or may be completely free of adhesive. In at least one other embodiment of the present disclosure, removable region lower surface 122B is covered with a liner material (not shown), which liner material is free of adhesive on its exposed side. In at least one embodiment of the present disclosure, label 100 is provided on a carrier (not shown), wherein adhesive 126 on frame region lower surface 124B is removably adhered to the carrier. For example, such a carrier may be a silicone coated liner material of a type known in the art, and adhesive 126 may be of a type that removably adheres to a silicone coated liner material, but also permanent or semi-permanently adheres to other surfaces. In at least one embodiment of the present disclosure, indicia is added to lower side 100B of label 100. For example, indicia may be added to removable region lower surface 122B of label 100, or to any adhesive-free area of frame region lower surface 124B of label 100, or to both removable region lower surface 122B and to any adhesive-free area of frame region lower surface 124B of label 100.

FIG. 2A shows upper side 200A of label 200 according to at least one embodiment of the present disclosure. In at least one embodiment of the present disclosure, label 200 comprises a label stock material such as, for example, paper, polyester, or another polymer material. In at least one embodiment of the present disclosure, label 200 comprises a label stock material receptive to the printing of indicia thereon. For example, label 200 may be exposed to an ink jet printer, a laser printer, a thermal transfer printer, a direct thermal printer, or another type of printing device capable of applying indicia to label 200. The inks, toners, and/or other printing materials used in the application of indicia to label 200 are selected to be compatible with the printing device used to apply such indicia, the material used for label 200, and the intended use of label 200.

As shown in FIG. 2A, label 200 is bounded by leading edge 202A, 202B, trailing edge 206, and side edges 204, 208. Label 200 also comprises removable region 222 and frame region 224. Removable region 222 comprises removable region upper surface 222A, and is bounded by lines of weakness 210, 212, 214, 216, 218, 220. Frame region 224 comprises the portion of label 200 outside of lines of weakness 210, 212, 214, 216, 218, 220, but within leading edge 202A, 202B, trailing edge 206, and side edges 204, 208. As shown in FIG. 2A, frame region 224 comprises frame region upper surface 224A. In at least one embodiment of the present disclosure, indicia is added to upper side 200A of label 200. For example, indicia may be added to removable region upper surface 222A of label 200, or to frame region upper surface 224A of label 200, or to both removable region upper surface 222A and frame region upper surface 224A of label 200.

Lines of weakness 210, 212, 214, 216, 218, 220 serve to weaken the boundary between removable region 222 and frame region 224, facilitating the removal of removable region 222 from frame region 224 as discussed hereinafter. Lines of weakness 210, 212, 214, 216, 218, 220 may comprise cuts or perforations that extend partially or completely through label 200.

In at least one embodiment of label 200, line of weakness 210 comprises a curvilinear cut that completely severs removable region 222 from frame region 224. In at least one embodiment of label 200, line of weakness 210 comprises a curvilinear cut that is the connecting an end of line of weakness 212 to an end of line of weakness 214. In the embodiment of label 200 shown in FIG. 2A, a portion of frame region 224 is removed to form notch 228. In the embodiment of label 200 shown in FIG. 2A, notch 228 exposes line of weakness 210.

In at least one embodiment of label 200, lines of weakness 212, 214 comprise a series of angular perforations generally having a V-shape or a Y-shape. The vertex of each angular perforation of line of weakness 212 is oriented in the direction of line of weakness 220, as shown in FIG. 2A. The series of angular perforations comprising line of weakness 212 is arranged so that one side of each angular perforation is substantially coincident with a line extending between an end of line of weakness 210 and an end of line of weakness 220, and the other side of each angular perforation is oriented toward removable region 222 rather than toward frame region 224. The vertex of each angular perforation of line of weakness 214 is oriented in the direction of line of weakness 216, as shown in FIG. 2A. The series of angular perforations comprising line of weakness 214 is arranged so that one side of each angular perforation is substantially coincident with a line extending between an end of line of weakness 210 and an end of line of weakness 216, and the other side of each angular perforation is oriented toward removable region 222 rather than toward frame region 224.

In at least one embodiment of label 200, the angle between line of weakness 212 and lines of weakness 220 is greater than 90°. In at least one embodiment of label 200, the angle between line of weakness 214 and lines of weakness 216 is greater than 90°. In at least one embodiment of label 200, the angle between line of weakness 218 and line of weakness 220 is about 90°. In at least one embodiment of label 200, the angle between line of weakness 218 and line of weakness 216 is about 90°. The use of angular perforations in lines of weakness 212, 214, and the obtuse angles between line of weakness 212 and lines of weakness 220 and between line of weakness 214 and lines of weakness 216, facilitates removal of removable region 222 from frame 224 in one motion without tearing the material of removable region 222.

FIG. 2B shows lower side 200B of label 200 according to at least one embodiment of the present disclosure. Shown in FIG. 2B are label 200 bounded by leading edge 202A, 202B, trailing edge 206, and side edges 204, 208. Removable region 222 also is shown in FIG. 2B, bounded by lines of weakness 210, 212, 214, 216, 218, 220. Frame region 224 also is shown in FIG. 2B, comprising the area of label 200 outside of lines of weakness 210, 212, 214, 216, 218, 220, but within leading edge 202A, 202B, trailing edge 206, and side edges 204, 208. Notch 228 also is shown on FIG. 2B.

As shown in FIG. 2B, removable region 222 comprises removable region lower surface 222B. As shown in FIG. 2B, frame region 224 comprises frame region lower surface 224B. As shown in FIG. 2B, frame region lower surface 224B is at least partially covered with adhesive 226, while removable region lower surface 222B has reduced adhesive properties or may be completely free of adhesive. In at least one other embodiment of the present disclosure, removable region lower surface 222B is covered with a liner material (not shown), which liner material is free of adhesive on its exposed side. In at least one embodiment of the present disclosure, label 200 is provided on a carrier (not shown), wherein adhesive 226 on frame region lower surface 224B is removably adhered to the carrier. For example, such a carrier may be a silicone coated liner material of a type known in the art, and adhesive 226 may be of a type that removably adheres to a silicone coated liner material, but also permanent or semi-permanently adheres to other surfaces. In at least one embodiment of the present disclosure, indicia is added to lower side 200B of label 200. For example, indicia may be added to removable region lower surface 222B of label 200, or to any adhesive-free area of frame region lower surface 224B of label 200, or to both removable region lower surface 222B and to any adhesive-free area of frame region lower surface 224B of label 200.

FIG. 3A shows upper side 300A of label 300 according to at least one embodiment of the present disclosure. In at least one embodiment of the present disclosure, label 300 comprises a label stock material such as, for example, paper, polyester, or another polymer material. In at least one embodiment of the present disclosure, label 300 comprises a label stock material receptive to the printing of indicia thereon. For example, label 300 may be exposed to an ink jet printer, a laser printer, a thermal transfer printer, a direct thermal printer, or another type of printing device capable of applying indicia to label 300. The inks, toners, and/or other printing materials used in the application of indicia to label 300 are selected to be compatible with the printing device used to apply such indicia, the material used for label 300, and the intended use of label 300.

As shown in FIG. 3A, label 300 is bounded by leading edge 302A, 302B, trailing edge 306, and side edges 304, 308. Label 300 also comprises removable region 322 and frame region 324. Removable region 322 comprises removable region upper surface 322A, and is bounded by lines of weakness 310, 312, 314, 316, 318, 320. Frame region 324 comprises the portion of label 300 outside of lines of weakness 310, 312, 314, 316, 318, 320, but within leading edge 302A, 302B, trailing edge 306, and side edges 304, 308. As shown in FIG. 3A, frame region 324 comprises frame region upper surface 324A. In at least one embodiment of the present disclosure, indicia is added to upper side 300A of label 300. For example, indicia may be added to removable region upper surface 322A of label 300, or to frame region upper surface 324A of label 300, or to both removable region upper surface 322A and frame region upper surface 324A of label 300.

Lines of weakness 310, 312, 314, 316, 318, 320 serve to weaken the boundary between removable region 322 and frame region 324, facilitating the removal of removable region 322 from frame region 324 as discussed hereinafter. Lines of weakness 310, 312, 314, 316, 318, 320 may comprise cuts or perforations that extend partially or completely through label 300.

In at least one embodiment of label 300, line of weakness 310 comprises a curvilinear cut that completely severs removable region 322 from frame region 324. In at least one embodiment of label 300, line of weakness 310 comprises a curvilinear cut that is the connecting an end of line of weakness 312 to an end of line of weakness 314. In at least one embodiment of label 300, line of weakness 310 comprises a curvilinear cut comprising apex 328. In at least one embodiment of label 300, apex 328 of line of weakness 310 intersects leading edge 302A, 302B.

In at least one embodiment of label 300, lines of weakness 312, 314 comprise a series of angular perforations generally having a V-shape or a Y-shape. The vertex of each angular perforation of line of weakness 312 is oriented in the direction of line of weakness 320, as shown in FIG. 3A. The series of angular perforations comprising line of weakness 312 is arranged so that one side of each angular perforation is substantially coincident with a line extending between an end of line of weakness 310 and an end of line of weakness 320, and the other side of each angular perforation is oriented toward removable region 322 rather than toward frame region 324. The vertex of each angular perforation of line of weakness 314 is oriented in the direction of line of weakness 316, as shown in FIG. 3A. The series of angular perforations comprising line of weakness 314 is arranged so that one side of each angular perforation is substantially coincident with a line extending between an end of line of weakness 310 and an end of line of weakness 316, and the other side of each angular perforation is oriented toward removable region 322 rather than toward frame region 324.

In at least one embodiment of label 300, the angle between line of weakness 312 and lines of weakness 320 is greater than 90°. In at least one embodiment of label 300, the angle between line of weakness 314 and lines of weakness 316 is greater than 90°. In at least one embodiment of label 300, the angle between line of weakness 318 and line of weakness 320 is about 90°. In at least one embodiment of label 300, the angle between line of weakness 318 and line of weakness 316 is about 90°. The use of angular perforations in lines of weakness 312, 314, and the obtuse angles between line of weakness 312 and lines of weakness 320 and between line of weakness 314 and lines of weakness 316, facilitates removal of removable region 322 from frame 324 in one motion without tearing the material of removable region 322.

Figure 3B:
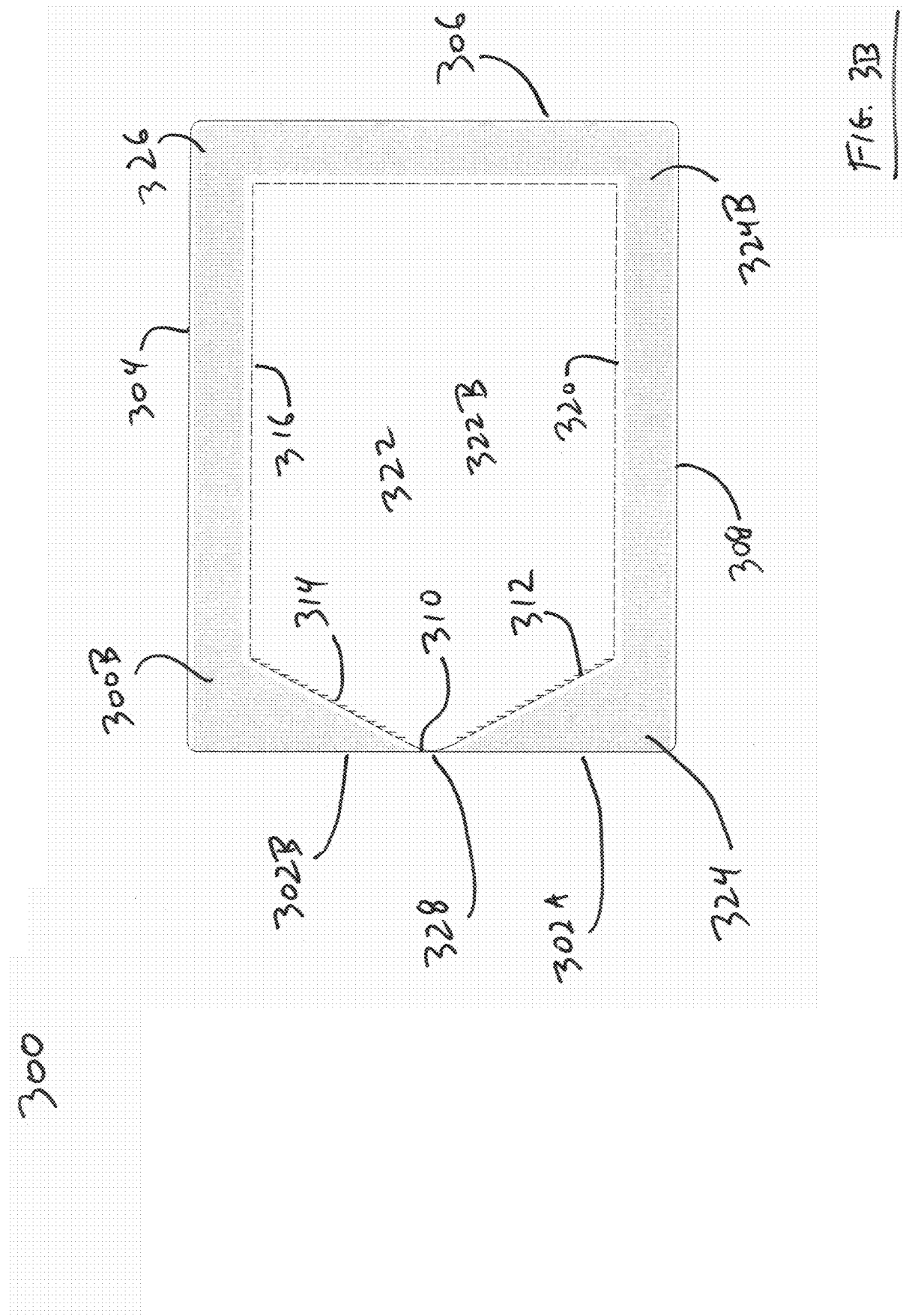
FIG. 3B shows the lower side of a label according to at least one embodiment of the present disclosure.

FIG. 3B shows lower side 300B of label 300 according to at least one embodiment of the present disclosure. Shown in FIG. 3B are label 300 bounded by leading edge 302A, 302B, trailing edge 306, and side edges 304, 308. Removable region 322 also is shown in FIG. 3B, bounded by lines of weakness 310, 312, 314, 316, 318, 320. Frame region 324 also is shown in FIG. 3B, comprising the area of label 300 outside of lines of weakness 310, 312, 314, 316, 318, 320, but within leading edge 302A, 302B, trailing edge 306, and side edges 304, 308. Apex 328 of line of weakness 310 also is shown on FIG. 3B.

As shown in FIG. 3B, removable region 322 comprises removable region lower surface 322B. As shown in FIG. 3B, frame region 324 comprises frame region lower surface 324B. As shown in FIG. 3B, frame region lower surface 324B is at least partially covered with adhesive 326, while removable region lower surface 322B has reduced adhesive properties or may be completely free of adhesive. In at least one other embodiment of the present disclosure, removable region lower surface 322B is covered with a liner material (not shown), which liner material is free of adhesive on its exposed side. In at least one embodiment of the present disclosure, label 300 is provided on a carrier (not shown), wherein adhesive 326 on frame region lower surface 324B is removably adhered to the carrier. For example, such a carrier may be a silicone coated liner material of a type known in the art, and adhesive 326 may be of a type that removably adheres to a silicone coated liner material, but also permanent or semi-permanently adheres to other surfaces. In at least one embodiment of the present disclosure, indicia is added to lower side 300B of label 300. For example, indicia may be added to removable region lower surface 322B of label 300, or to any adhesive-free area of frame region lower surface 324B of label 300, or to both removable region lower surface 322B and to any adhesive-free area of frame region lower surface 324B of label 300.

FIG. 4 shows the application of label 100 to carton 400 according to at least one embodiment of the present disclosure. As shown in FIG. 4, according to at least one embodiment of the present disclosure a pair of labels 100 (identified as lower label 100' and upper label 100" in FIG. 4) are applied to carton 400, either mechanically (such as, for example, by a label applicator apparatus) or by hand.

In at least one embodiment of the present disclosure, prior to or in conjunction with the application of lower label 100' to carton 400, indicia is added to removable region upper surface 122A of lower label 100'. For example, where lower label 100' is intended to serve as a packing list, such indicia may comprise the contents of carton 400.

For purposes of applying lower label 100' to carton 400, lower label 100' is oriented such that lower side 100B' of lower label 100' faces carton 400. Lower label 100' is moved in the direction shown by arrow 403 until adhesive 126 on lower side 100B' of lower label 100' comes into contact with upper surface 402 of carton 400. Adhesive 126 on lower side 100B' of lower label 100' permanent or semi-permanently adheres frame region lower surface 124B of lower label 100' to upper surface 402 of carton 400. Removable region lower surface 122B of lower label 100' also is adjacent to upper surface 402 of carton 400, but because removable region lower surface 122B of lower label 100' has reduced adhesive properties or may be completely free of adhesive, removable region lower surface 122B of lower label 100' does not adhere to upper surface 402 of carton 400.

In at least one embodiment of the present disclosure, upper label 100" is applied over, and in registration with, lower label 100'. In at least one embodiment, prior to or in conjunction with the application of upper label 100" to carton 400, indicia is added to upper side 100A" of upper label 100", such as within removable region upper surface 122A of upper label 100". For example, where upper label 100" is intended to serve as a shipper label, such indicia may comprise the address to which carton 400 is to be shipped, a return address, bar codes, maxicodes, identifying numbers, and the like.

For purposes of applying upper label 100" to lower label 100', upper label 100" is oriented such that lower side 100B" of upper label 100" faces upper side 100A' upper side 100A'. Upper label 100" is moved in the direction shown by arrow 404 until adhesive 126 on lower side 100B" of upper label 100" comes into contact with upper side 100A' of lower label 100'. Adhesive 126 on lower side 100B" of upper label 100" permanent or semi-permanently adheres frame region lower surface 124B of upper label 100" to frame region upper surface 124A of lower label 100'. Removable region lower surface 122B of upper label 100" also is adjacent to, and in registration with, removable region upper surface 122A of lower label 100', but because removable region lower surface 122B of upper label 100" has reduced adhesive properties or may be completely free of adhesive, removable region lower surface 122B of upper label 100" does not adhere to removable region upper surface 122A of lower label 100'.

It also is within the scope of the present disclosure that upper label 100" may be adhered to lower label 100' in the manner described above before lower label 100' is applied to upper surface 402 of carton 400. In such an embodiment, after upper label 100" is adhered to lower label 100', the adhered-together labels 100 then are applied simultaneously to carton 400.

After being presented with this disclosure, those skilled in the art will appreciate that a pair of labels 200 or a pair of labels 300 may be applied to a shipping carton 400 in the same manner as described above with respect to the pair of labels 100.

A person in possession of carton 400 (such as the recipient of carton 400) with the pair of labels 100 adhered thereto may remove removable region 122 of upper label 100" to reveal removable region 122 of lower label 100'. For example, a person in possession of carton 400 (such as the recipient of carton 400) may be interested in knowing the contents of carton 400, and removable region 122 of lower label 100' may be a packing list comprising indicia that reveals the contents of carton 400.

In at least one embodiment, because removable region 122 of upper label 100" is not adhered to lower label 100', removable region 122 of upper label 100" may be removed from frame region 124 of upper label 100" by first separating removable region 122 of upper label 100" from frame region 124 of upper label 100" at line of weakness 110, such as by inserting a fingernail or other implement through line of weakness 110 and lifting the portion of removable region 122 of upper label 100" adjacent line of weakness 110. After the portion of removable region 122 adjacent line of weakness 110 is separated from frame region 124, the remainder of removable region 122 of upper label 100" may be separated from frame region 124 of upper label 100" along lines of weakness 112, 114, 116, 118, 120, and, if desired, fully removed from upper label 100". Frame region 124 of upper label 100" remains adhered to lower label 100'.

Similarly, in at least one embodiment, because removable region 122 of lower label 100" is not adhered to carton 400, removable region 122 of lower label 100' may be removed from frame region 124 of lower label 100' by first separating removable region 122 of lower label 100' from frame region 124 of lower label 100' at line of weakness 110, such as by inserting a fingernail or other implement through line of weakness 110 and lifting the portion of removable region 122 of lower label 100' adjacent line of weakness 110. After the portion of removable region 122 adjacent line of weakness 110 is separated from frame region 124, the remainder of removable region 122 of lower label 100' may be separated from frame region 124 of lower label 100' along lines of weakness 112, 114, 116, 118, 120, and, if desired, fully removed from lower label 100'. Frame region 124 of lower label 100' remains adhered to carton 400.

FIG. 5 shows the dispensing of label 100 from label printer 500 according to at least one embodiment of the present disclosure. Shown in FIG. 5 is label printer 500, comprising a printing mechanism (not shown), dispensing mechanism 501, and tray 502. Label printer 500 may comprise an ink jet printer, a laser printer, a thermal transfer printer, a direct thermal printer, or another type of printing device capable of applying indicia to each label 100. According to at least one embodiment of the present disclosure, tray 502 is horizontal or substantially horizontal. In other embodiments tray 502 may be oriented at an inclining or declining angle. As shown in FIG. 5, according to at least one embodiment of the present disclosure, a plurality of labels 100 are provided to label printer 500 on a carrier (not shown). For example, a plurality of labels 100 are removably adhered to carrier material in a rolled configuration or in a fan-folded configuration, and are supplied to label printer 500 in a manner anticipating printing by and dispensing from label printer 500. As shown in FIG. 5, two labels 100 (identified as lower label 100' and upper label 100" in FIG. 5) are dispensed in sequence from label printer 500. The pair of labels 100 are dispensed by dispensing mechanism 501 of label printer 500, such that each label 100 is separated from the carrier material and released from label printer 500 in the direction of arrow 505, and then come to rest, in registration with one another, on tray 502 of label printer 500. Thereafter, the pair of labels 100, in registration with one another and adhered together, can be retrieved from tray 502, either mechanically (such as, for example, by a label applicator apparatus) or by hand, and applied to a surface (such as, for example, upper surface 402 of carton 400), either mechanically (such as, for example, by a label applicator apparatus) or by hand.

In at least one embodiment of the present disclosure, prior to or in conjunction with the dispensing of lower label 100' onto tray 502 of label printer 500, indicia is added to removable region upper surface 122A of lower label 100' by the printing mechanism (not shown) of label printer 500. For example, where lower label 100' is intended to serve as a packing list, such indicia may comprise the contents of a container to which label 100' will be adhered, such as carton 400.

Lower label 100' is dispensed from label printer 500 such that lower side 100B' of lower label 100' faces tray 502 of label printer 500. Lower label 100' moves in the direction shown by arrow 503 until lower side 100B' of lower label 100' comes into contact with tray 502 of label printer 500. Because no pressure is exerted on upper side 100A' of lower label 100', adhesive 126 on lower side 100B' of lower label 100' does not adhere frame region lower surface 124B of lower label 100' to tray 502 of label printer 500. In at least one embodiment, tray 502 comprises a non-stick surface that retards adherence of adhesive 126 to tray 502. Removable region lower surface 122B of lower label 100' also is adjacent to tray 502 of label printer 500, but because removable region lower surface 122B of lower label 100' has reduced adhesive properties or may be completely free of adhesive, removable region lower surface 122B of lower label 100' also does not adhere to tray 502 of label printer 500.

In at least one embodiment of the present disclosure, upper label 100" then is dispensed from label printer 500. Upper label 100" alights on top of, and in registration with, lower label 100'. In at least one embodiment, prior to or in conjunction with the dispensing of upper label 100" onto tray 502 of label printer 500, indicia is added to upper side 100A" of upper label 100", such as within removable region upper surface 122A of upper label 100", by the printer mechanism (not shown) of label printer 500. For example, where upper label 100" is intended to serve as a shipping label, such indicia may comprise the address to which a container to which label 100' will be adhered, such as carton 400, is to be shipped, a return address, bar codes, maxicodes, identifying numbers, and the like.

Upper label 100" is dispensed from label printer 500 such that lower side 100B" of upper label 100" faces upper side 100A' upper side 100A'. Upper label 100" moves in the direction shown by arrow 504 until adhesive 126 on lower side 100B" of upper label 100" comes into contact with upper side 100A' of lower label 100'. Adhesive 126 on lower side 100B" of upper label 100" adheres frame region lower surface 124B of upper label 100" to frame region upper surface 124A of lower label 100' to a sufficient degree that the pair of labels can be handled as a unit, either mechanically (such as, for example, by a label applicator apparatus) or by hand. Removable region lower surface 122B of upper label 100" also is adjacent to, and in registration with, removable region upper surface 122A of lower label 100', but because removable region lower surface 122B of upper label 100" has reduced adhesive properties or may be completely free of adhesive, removable region lower surface 122B of upper label 100" does not adhere to removable region upper surface 122A of lower label 100'. In such an embodiment, after upper label 100" is adhered to lower label 100', the adhered-together labels 100 then are applied simultaneously to a surface, such as a upper surface 402 of carton 400, either mechanically (such as, for example, by a label applicator apparatus) or by hand.

After being presented with this disclosure, those skilled in the art will appreciate that a pair of labels 200 or a pair of labels 300 may be dispensed from label printer 500 in the same manner as described above with respect to the pair of labels 100.

After being presented with this disclosure, those skilled in the art will appreciate that removable region 222 of label 200 may be partially or fully removed from frame region 224 of label 200 in a similar manner as described above with respect to label 100. Notch 228 of label 200 facilitates access to line of weakness 210 of label 200, which may enhance the ease of removing removable region 222 from frame region 224 of label 200.

After being presented with this disclosure, those skilled in the art will appreciate that removable region 322 of label 300 may be partially or fully removed from frame region 324 of label 300 in a similar manner as described above with respect to label 100. The intersection of apex 328 with leading edge 302A, 302B of label 300 facilitates access to line of weakness 310 of label 300, which may enhance the ease of removing removable region 322 from frame region 324 of label 300.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A method for assembling a multi-layer label, the method comprising the steps of:
   providing a label printing apparatus, said label printing apparatus comprising a printing mechanism, a dispensing mechanism, and a receptacle;
   providing a carrier material to said label printing apparatus, said carrier material comprising a first label removably adhered to said carrier material, said first label comprising:
      a sheet material having an upper side and an opposing lower side, said upper side and said lower side bounded by a leading edge, a trailing edge, and first and second side edges,
      at least one line of weakness in said sheet material, said at least one line of weakness at least partially defining a removable region of said sheet material, and
      adhesive on at least a portion of said lower side;
   separating said first label from said carrier material with said label printing apparatus;
   dispensing said first label from said label printing apparatus onto said receptacle;
   advancing said carrier material to provide a second label adjacent to said first label and removably adhered to said carrier material, said second label comprising a removable region;
   separating said second label from said carrier material with said label printing apparatus; and
   dispensing said second label from said carrier material, wherein said second label alights on said first label such that said second label is layered over and in contact with said first label with said removable region of said first label in registration with said removable region of said second label.

2. The method for assembling a multi-layer label of claim 1, wherein:
   said at least one line of weakness does not intersect with any of said leading edge, said trailing edge, or said first or second side edges, and defines said removable region within said at least one line of weakness and a frame region outside of said at least one line of weakness, and
   said adhesive is on at least a portion of said frame region of said lower side.

3. The method for assembling a multi-layer label of claim 2, wherein:
   said first label comprises a void in said sheet material located between said at least one line of weakness and said leading edge.

4. The method for assembling a multi-layer label of claim 1, wherein:
   said at least one line of weakness comprises at least one non-linear segment having an apex oriented toward said leading edge.

5. The method for assembling a multi-layer label of claim 4, wherein:
   said first label comprises a void in said sheet material located between said at least one non-linear segment and said leading edge.

6. The method for assembling a multi-layer label of claim 1, wherein:
   said at least one line of weakness comprises at least one non-linear segment having an apex oriented toward and intersecting with said leading edge, said at least one line of weakness not otherwise intersecting with any of said leading edge, said trailing edge, or said first or second side edges.

7. The method for assembling a multi-layer label of claim 1, wherein said second label is identical in structure to said first label.

* * * * *